June 18, 1968  W. MAYNARD  3,388,923
KINGPIN ASSEMBLY AND METHOD FOR USING SAME
Filed Sept. 27, 1965
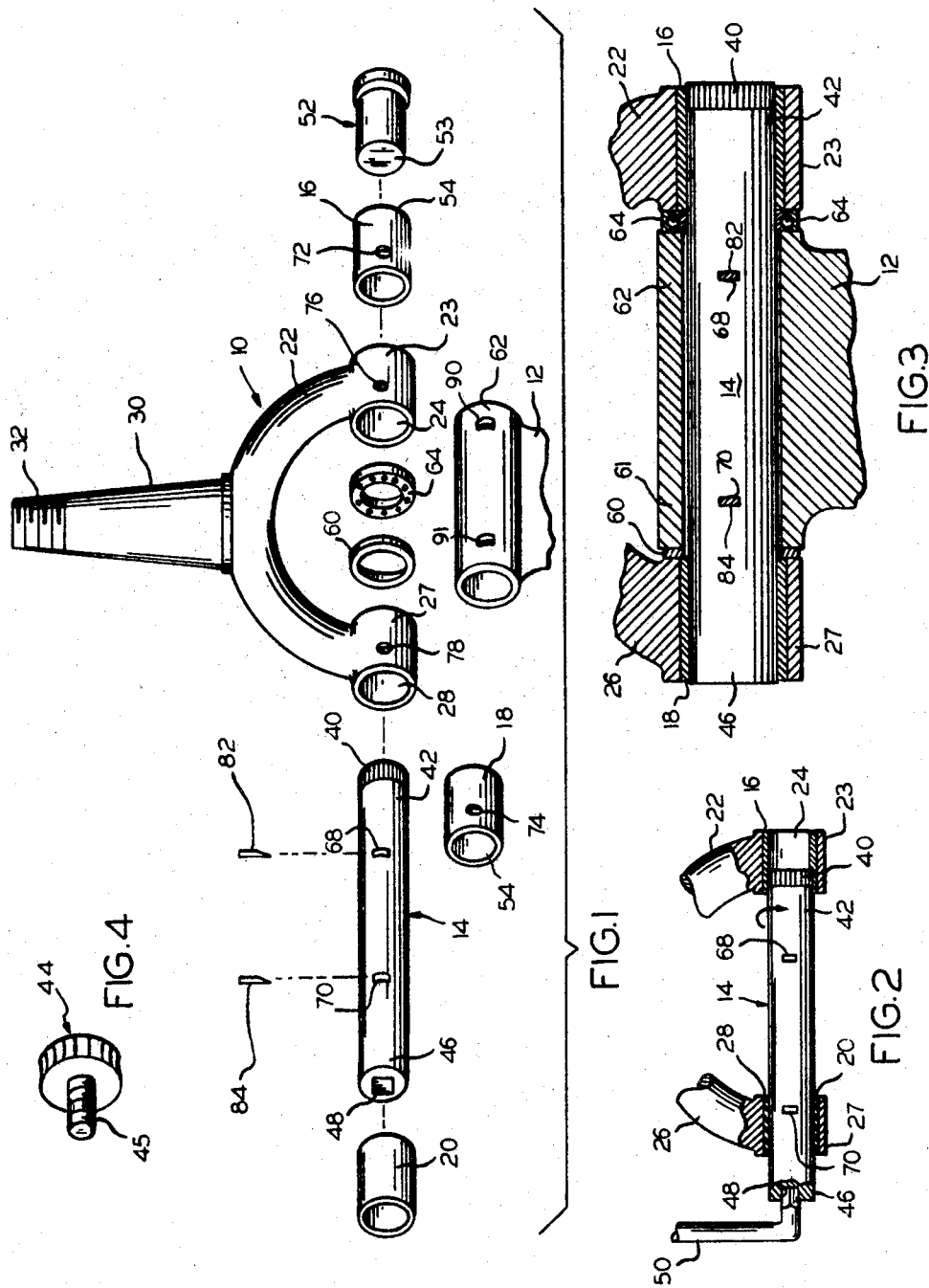
INVENTOR
WADE MAYNARD
BY
*Mullin and Alter*
ATTORNEYS

3,388,923
KINGPIN ASSEMBLY AND METHOD FOR USING SAME
Wade Maynard, 11652 Joalyce Drive, Alsip, Ill. 60658
Filed Sept. 27, 1965, Ser. No. 490,466
8 Claims. (Cl. 280—96.1)

This invention relates to a novel kingpin assembly and the method for using same and more particularly relates to a self-contained kingpin assembly that provides a precision fit between a kingpin and its associated bushings.

The periodic replacement of the kingpins in the front axle part of a car or truck is an essential safety precaution. The replacement of a worn kingpin with a new kingpin also requires a new set of bushings to be inserted in openings of the front axle spindle. Due to the occurrence of distortion when inserting the new bushings, it is necessary to machine the same inside the spindle openings to the proper internal diameter. It was therefore required prior to the invention herein, to have the proper precision tools on hand in the auto repair shop in order to accurately and efficiently machine the various sizes of bushings for the different type cars or trucks. If such precision tools were not available in the repair shop, which was quite often the case, it was then necessary to hand carry the spindle to the machine shop to ream the bushings to the proper size. This resulted in a substantial loss of time and in addition was an extra labor expense which could not justifiably be passed on to the customer. To further compound the problem, the need for said services of the machine shop quite often occurred after normal working hours or during the weekend when the machine shop was closed.

It is therefore a primary object of this invention to provide a self-contained kingpin assembly which does not require special precision tools in order to machine the bushings for the kingpin, to a proper internal dimension.

It is another primary object of this invention to provide a kingpin that is capable of reaming its associated bushings to a proper internal dimension, in order to operatively associate a spindle with a cross-member.

It is still another object of this invention to provide a method for using the self-contained kingpin assembly of this invention in order to ream out the bushings for the kingpin to a proper internal dimension.

It is a primary feature of this invention to provide a cutter at the leading end of a kingpin, to ream out the bushings for the kingpin, to a proper internal dimension.

It is another feature to provide a coupling means at the trailing end of a kingpin having a cutter at the leading end thereof, in order to rotate the kingpin when using the kingpin to machine the kingpin bushings.

It is another feature to provide a kingpin assembly including a pilot bushing to guide a kingpin having a cutter at the leading end thereof, when the kingpin is used to ream out a kingpin bushing.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

FIG. 1 is a perspective view of the kingpin assembly spaced apart from the spindle and cross-member associated with the front axle of a motor vehicle and embodying the principles of the invention;

FIG. 2 is a fragmentary view with portions cut away to show the kingpin and associated elements, when the cutter at the leading end of the kingpin is reaming out a primary bushing in the opening of one of the spindle arms;

FIG. 3 is an enlarged fragmentary sectional view with portions cut away to show the kingpin operatively associating the cross-member to the spindle; and FIG. 4 illustrates a removable cutter part for the kingpin.

Referring now to FIG. 1, the novel self-contained kingpin assembly embodying the principles of the invention is shown spaced apart from a spindle 10 and a front axle I beam or cross-member 12. The kingpin assembly comprises a kingpin or spindle bolt 14, a primary bushing 16, a primary bushing 18, and a pilot bushing 20.

As shown, the spindle 10 includes a first arm 22 having a first cylindrical end portion 23 defining a first cylindrical opening 24, and a second arm 26 having a second cylindrical end portion 27 defining a second cylindrical opening 28. A handle portion 30 extends outwardly from the junction of arms 22 and 26. The handle portion 30 may have a threaded end 32 to threadedly associate with a front wheel of an automobile or truck.

The kingpin 14 includes a cutter or reamer 40 at the leading end 42 thereof which may be an integral part of the leading end 42 of kingpin 14. The cutter 40 is sized to form the bushings 16, 18 inside the cylindrical openings 24, 28 to the proper internal dimension. The proper internal dimension is a value to provide a close fit between the bushings and the kingpin which is, however, not a press fit. The preferable manner for using the cutter 40 will be discussed further in the description.

Alternatively, instead of the cutter 40 being an integral part of the kingpin 14, a separate cutter part 44 as shown in FIG. 4 may be used. Cutter part 44 includes a screw portion 45 which may be threadedly associated with a threaded hole (not shown) in the leading end 42 of the kingpin 14.

The trailing end 46 of the kingpin 14 may include a coupling means such as an opening 48 dimensioned to securely receive a conventional lever arm 50. As shown in FIG. 1, but in no way a limitation, the opening 48 is square shaped to accommodate a conventional ratchet with a square head. By providing the opening 48, kingpin 14 may be easily and conveniently rotated with normally available tools, when reaming bushings 16 and 18.

The first bushing 16 and the second bushing 18 are sized to tightly press fit into cylindrical openings 24 and 28. The primary bushings 16 and 18 may be constructed of bronze or other suitable material.

A bushing driver 52 with a flat front face 53 may be used to insert the bushings 16, 18 into openings 24, 28 by forcibly contacting the bushing outer edge 54. The bushing driver may be made from neoprene or other suitable material, and disposed of after use.

The pilot bushing 20 is inserted into a cylindrical opening (either cylindrical opening 24 or cylindrical opening 28) which does not have a primary bushing inserted therein. The pilot bushing 20 guides the kingpin 14 so that the cutter 40 may evenly and accurately ream out the bushing inserted in the other cylindrical opening. For economical considerations and ease in inserting the pilot bushing inside the opening 24 and 28, a neoprene plastic material has been found to be acceptable. After use the pilot bushing may be disposed.

As illustrated in FIG. 2, the pilot bushing 20 inside opening 28 guides and supports the kingpin 14 while the cutter 40 reams out the primary bushing 16 inside opening 24. After the primary bushing 16 has been reamed out, the kingpin 14 is removed from within the reamed primary bushing 16 and pilot bushing 20, and then the neoprene bushing 20 is taken out from opening 28. The reamed primary bushing 16 now serves as the guide for the kingpin when the other primary bushing 18 is being machined by the cutter 40.

A shim 60 may be positioned between the arm 26 of spindle 10 and one end 61 of the front axle I beam 12 (see FIG. 3). Between end 62 of the front axle I beam 12 and arm 22 a bearing member 64 may be placed. As shown in FIG. 3, the shim 60 and bearing member 64 encircle the kingpin 14.

The primary bushings 16 and 18 include respectively apertures 72 and 74. The cylindrical end portions 23 and 27 of spindle 10 have holes 76 and 78 respectively which align with aperture 72, 74 of the bushings 16 and 18. These communicating openings serve as passageways for grease or oil to lubricate the area wherein the ends 42, 46 of kingpin 14 pivot.

The kingpin 14 includes a pair of spaced apart slots 68, 70 (see FIGS. 1 and 2). When the kingpin 14 is operatively positioned within cross-member 12 and within the primary bushings 16 and 18 as shown in FIG. 3, the slot 68 is in alignment with opening 90 of cross-member 12 to receive a wedge 82 (FIGS. 1 and 3). Similarly, slot 70 is in alignment with opening 91 of cross-member 12 to accommodate a wedge 84 (FIGS. 1 and 3). Wedges 82 and 84 are tightly and securely fitted into position and maintain the kingpin 14 secured to cross-member 12 and in operative association with the spindle 10.

With reference to FIGS. 1 and 2, a preferred method for using the self-contained kingpin assembly herein disclosed will now be described. A primary bushing is inserted into one of the cylindrical openings of the spindle. As shown in FIG. 2, primary bushing 16 is initially inserted into the first cylindrical opening 24. The kingpin 14 is placed first through the second cylindrical opening 28 with the cutter 40 directed toward the inserted bushing 16. The pilot bushing 20 is placed over kingpin 14 and inserted within the cylindrical opening 28 to guide the kingpin 14 as the cutter 40 reams out the primary bushing 16 upon the rotation of lever arm 50.

After primary bushing 16 has been reamed out, the kingpin 14 is removed from within the reamed out bushing 16 and the pilot bushing 20. The pilot bushing 20 is removed and primary bushing 18 is press fitted into the second cylindrical opening 28. The kingpin 14 is now first inserted through primary bushing 16 within the first cylindrical opening 24 with the cutter 40 directed toward cylindrical opening 28. The reamed out primary bushing 16 serves as a guide for the kingpin 14, while it reams out primary bushing 18.

After the primary bushing 18 has been properly reamed out, the kingpin 14 is again removed and cross-member 62 is inserted between the cylindrical end portions 23 and 27 with the shim 60 and bearing 64 on the opposite ends 61 and 62 thereof (see FIG. 3). The reinsertion of kingpin 14 with wedges 82 and 84 in place affords an operable association of the kingpin with the spindle and cross-member.

From the foregoing description and drawings, it should be apparent that I have provided a novel self-contained kingpin assembly which accomplishes the aforestated objects and features in a remarkably unexpected fashion. A kingpin is included which comprises a cutter at the leading end thereof which is dimensioned to ream out the primary bushings to a proper internal dimension. Moreover, a coupling means is included at the trailing end of the kingpin whereto a convention lever arm may be attached for rotating the kingpin in order to ream out the primary bushings. Furthermore, a pilot bushing is provided to guide the kingpin as the cutter at the leading end thereof, reams out a primary bushing.

Still further, I have provided a novel method aforestated for utilizing the self-contained kingpin assembly herein disclosed in order to operatively replace the primary bushings and kingpin associated with the front axle part of a motor vehicle.

Although the kingpin 14 is shown as having a constant cross-section, it should be apparent that the principles disclosed herein would be applicable to a tapered type kingpin as well.

It is believed that my invention, its mode of construction and assembly and method for using the same and many of its advantages and features should be readily understood from the aforegoing without further description, and it should also be manifest that while preferred embodiments of this invention have been shown and described for illustrative purposes, the structural details and the novel method for using the self-contained kingpin assembly are nevertheless capable of wide variation within the purview of my invention as defined in the appended claims.

What I claim and desire to secure by Letters Patent of the United States is:

1. A kingpin assembly for associating a spindle with a cross-member comprising:
   a pair of primary bushings disposed respectively within a first opening and a second opening of said spindle; and
   a kingpin having a cutter at the leading end thereof, said cutter being sized to ream out said first and second primary bushings to a proper internal dimension when said bushings are disposed within the openings of said spindle, said kingpin being positioned through the reamed out said first and second primary bushings and said cross-member to provide an operative association of said spindle with said cross-member.

2. A kingpin assembly as defined in claim 1, wherein said cutter includes a screw portion to threadedly engage in a threaded opening within said leading end of said kingpin.

3. A kingpin assembly as defined in claim 1, wherein said kingpin includes a coupling means at the trailing end thereof for releasably attaching a lever arm thereto to rotate said kingpin, whereupon said cutter reams out said bushings to said proper internal dimension.

4. A kingpin assembly as defined in claim 1, wherein a pilot bushing is disposed in one of the openings of said spindle prior to the placement of one of said primary bushings therein, said pilot bushing guiding said kingpin when rotating the same to ream out a primary bushing in the other said opening, the last-mentioned reamed out primary bushing serving as a guide for said kingpin when rotating the same to ream out the other of said primary bushings.

5. A kingpin assembly as defined in claim 3, wherein said coupling means is a substantially square opening to receive a ratchet with a square head.

6. A kingpin assembly for associating a spindle with a cross-member comprising:
   a pair of primary bushings press fitted respectively within a first opening and a second opening of said spindle;
   a kingpin having a leading end and a trailing end;
   a cutter associated with said leading end of said kingpin and sized to ream out said first and second primary bushings to the proper internal dimension when said bushings are fitted within the openings of said spindle;
   a coupling means included at said trailing end of said kingpin to releasably associate a lever arm thereto to rotate said kingpin whereupon said cutter reams out said bushings; and
   a pilot bushing disposed in one of the openings of said spindle prior to the placement therein of one of said primary bushings, said pilot bushing guiding said kingpin when rotating the same to ream out the primary bushing disposed in the other said opening, the reamed out primary bushing serving as a guide when rotating said kingpin for reaming out the other of said primary bushings.

7. A method for reaming a first and second primary bushing within a first and second opening of a spindle with a kingpin having a cutter at the leading end thereof, to provide a precision fit of said kingpin within said bushings, for operatively associating a cross-member with a spindle, said method comprising:
  inserting said first primary bushing within the first opening of said spindle;
  inserting said kingpin in said second opening with the cutter directed toward said first opening;
  inserting a pilot bushing into said second opening to guide said kingpin;
  rotating said kingpin to cause said kingpin to ream out said first primary bushing to a proper internal dimension;
  removing said kingpin from within said openings;
  removing said pilot bushing from within said second opening;
  inserting said second primary bushing within said second opening;
  inserting said kingpin within said reamed out first primary bushing with the cutter directed toward said second primary bushing;
  rotating said kingpin to ream out said second primary bushing to a proper internal dimension;
  removing said kingpin from within said openings;
  inserting a cross-member between said opening; and
  inserting said kingpin through said openings and said cross-member to operatively associate said cross-member with said spindle.

8. A self-contained kingpin assembly for reaming a primary bushing positioned within one of the openings of a spindle, to a proper internal dimension, said kingpin assembly comprising:
  a kingpin dimensioned to pass through said openings, said kingpin including a cutter at the leading end thereof, said cutter being sized to provide the proper internal dimension of said primary bushing; and
  a pilot bushing dimensioned to fit within the other of said openings of the spindle and over said kingpin, said pilot bushing guiding said kingpin as the cutter reams said primary bushing to said proper dimension.

References Cited

UNITED STATES PATENTS

| | | |
|---|---|---|
| 1,342,201 | 6/1920 | Beckwith. |
| 1,948,176 | 2/1934 | Hopkins et al. _____ 29—445 X |
| 2,267,925 | 12/1941 | Johnston. |
| 2,659,255 | 11/1953 | Bates. |
| 2,916,295 | 12/1959 | Sandberg _____ 280—96.1 |
| 2,208,189 | 6/1940 | Jones _____ 280—96.1 |

CHARLIE T. MOON, *Primary Examiner.*